United States Patent
Madaiah et al.

(10) Patent No.: US 10,489,236 B2
(45) Date of Patent: Nov. 26, 2019

(54) METHOD AND SYSTEM FOR MANAGING A COMMUNICATION NETWORK

(75) Inventors: Vinod Kumar Madaiah, Bangalore (IN); Puneet Sinha, Bangalore (IN)

(73) Assignee: TEJAS NETWORKS LTD, Bangalore (IN)

( * ) Notice: Subject to any disclaimer, the term of this patent is extended or adjusted under 35 U.S.C. 154(b) by 0 days.

(21) Appl. No.: 14/004,254

(22) PCT Filed: Aug. 11, 2011

(86) PCT No.: PCT/IN2011/000537
§ 371 (c)(1),
(2), (4) Date: Sep. 10, 2013

(87) PCT Pub. No.: WO2012/123953
PCT Pub. Date: Sep. 20, 2012

(65) Prior Publication Data
US 2014/0006845 A1  Jan. 2, 2014

(30) Foreign Application Priority Data

Mar. 11, 2011  (IN) .............................. 730/CHE/2011

(51) Int. Cl.
*G06F 11/07*  (2006.01)
*H04L 12/751*  (2013.01)
(Continued)

(52) U.S. Cl.
CPC .......... *G06F 11/0793* (2013.01); *H04L 45/02* (2013.01); *H04L 45/28* (2013.01); *H04L 45/48* (2013.01)

(58) Field of Classification Search
CPC ......... H04L 1/00; H04L 12/437; H04L 45/02; H04L 45/26; H04L 45/28; H04L 45/54;
(Continued)

(56) References Cited

U.S. PATENT DOCUMENTS

| 2003/0016624 A1* | 1/2003 | Bare ............................. 370/217 |
| 2005/0099956 A1* | 5/2005 | Mangetsu ..................... 370/242 |

(Continued)

OTHER PUBLICATIONS

Sengul, Cigdem; Kravets, Robin; Bypass Routing: An On-Demand Local Recovery Protocol for Ad Hoc Networks; 2004; Med-Hoc-Net-2004; pp. 93-105.*

*Primary Examiner* — Ricky Q Ngo
*Assistant Examiner* — Stephen N Steiner
(74) *Attorney, Agent, or Firm* — Oliff PLC

(57) ABSTRACT

Embodiments of the present invention described herein, discloses a method and system for managing a communication network using any loop avoidance or mitigation technology. The restoration of network under fault, or sub-optimal network condition, maintenance and improvement of network connectivity and network behaviour is based upon GET and POST commands. In one embodiment of the present invention, the restoration mechanism is used to maintain or improve network connectivity and network behaviour or function upon receipt of command from management plane or control plane to build optimal network condition (e.g: minimum hops, maximum bandwidth, etc.) for data traffic, within a communication network of any topology.

11 Claims, 3 Drawing Sheets

(51) Int. Cl.
*H04L 12/703* (2013.01)
*H04L 12/753* (2013.01)

(58) Field of Classification Search
CPC . H04L 41/04; H04L 41/0654; H04L 41/0659; H04L 41/12
See application file for complete search history.

(56) References Cited

U.S. PATENT DOCUMENTS

| | | |
|---|---|---|
| 2006/0187819 A1* | 8/2006 | Bryant et al. ................. 370/216 |
| 2007/0025275 A1* | 2/2007 | Tallet et al. ................... 370/255 |
| 2008/0165705 A1* | 7/2008 | Umayabashi et al. ........ 370/256 |
| 2009/0086725 A1* | 4/2009 | Lai et al. ....................... 370/352 |
| 2010/0157979 A1* | 6/2010 | Anisimov ........... H04L 65/1043 370/352 |
| 2010/0208595 A1* | 8/2010 | Zhao et al. .................... 370/242 |
| 2011/0116366 A1* | 5/2011 | Smith et al. ................... 370/225 |
| 2011/0273980 A1* | 11/2011 | Ashwood Smith ........... 370/225 |

* cited by examiner

METHOD AND SYSTEM FOR MANAGING A COMMUNICATION NETWORK

FIELD OF THE INVENTION

The present invention relates to protection switching and more particularly to restoration mechanism in a communication network.

BACKGROUND

In a typical computer network, the network peers send and receive data packets. Each packet of data follows a particular path from source peer to the destination peer. Generally, the network peers or nodes are connected using tree type topology or Ring topology.

In tree topology, path of a data packet is in the form of a tree wherein of network nodes are connected to each other. The data packets are sent from source to destination in a single unique path using a particular tree formation protocol.

Different tree formation protocols are known in the art including spanning tree protocol (STP), Rapid STP (RSTP), Multiple STP (MSTP) etc. The STP protocol is a Data Link Layer protocol defined in IEEE 802.1D. It creates a spanning tree within a mesh network of connected layer-2 bridges (typically Ethernet switches), and disables those links that are not part of the spanning tree, thereby leaving a single active path between any two network nodes.

Since STP is a slow mechanism, advanced and faster mechanisms were invented including the RSTP that provides for faster spanning tree convergence after a topology change and the MSTP that is an extension to RSTP to further develop the usefulness of virtual LANs (VLANs). This is a "Per-VLAN" Multiple Spanning Tree Protocol and hence configures a separate Spanning Tree for each VLAN group and blocks all but one of the possible alternate paths within each Spanning Tree.

In the ring network topology, each node connects to exactly two other nodes, forming a single continuous pathway for signals through each node—a ring. Data travels from node to node, with each node along the way handling every packet.

Whatever fashion the nodes may be connected in a network, any fault in the nodes and failure of path will disturb the data traffic. Thus restoration of faulty nodes and links are essential to ensure successful flow of the data traffic.

Various methods for restoring the faults are known in the art. These methods are based on the type of topology in which the nodes are connected to each other. For example in case of STP and RSTP, whenever there is a fault in the link, the nodes associated to that particular link will send a topology change message in the packet. Whichever node reads this message changes its topology and begins to form a new tree.

For a ring topology such as Ethernet Ring Protection Switching, (ERPS), protection and recovery switching is made by flushing or deleting all information learned by a node whenever that particular node receives the topology change message. Thereby, ensuring that there are no loops are formed at the Ethernet layer.

FIG. 1 illustrates how different restoration mechanism A, B, and C is applied on different network topologies A, B and C respectively as known in the prior art to restore the fault links. It is therefore apparent from FIG. 1 that recovery of a fault in the data path between a pair of nodes depends upon the type of topology in which the nodes are connected to each other in a network.

For high level working environments like VLAN, MAC, IP, QoS etc, a novel method for fault restoration is needed.

SUMMARY

An object of this invention is to provide a single restoration mechanism that may be applied on different network topologies to restore the network under fault condition.

In accordance with this there is provided a method and a system for restoring a fault link between a pair of nodes associated to the link within a communication network of any topology.

This is accomplished by first identifying membership with an existing tree within the network. Thereafter, occurrence of fault in any link of the tree may be identified. The existing tree may be identified by identifiers including VLAN identifier. Upon detecting the fault in a link, the nodes associated to the fault link seek information from its neighboring nodes. Wherein, the information includes data, port address, quality of message packet, priority etcetera. The information is then used for updating previous information that the nodes associated with the fault link have. The updated information thereby helps in restoring the network under fault.

In one embodiment of the present invention, the restoration mechanism is used to maintain or improve network connectivity and network behaviour or function upon receipt of command from management plane or control plane to build optimal network condition (e.g. minimum hops, maximum bandwidth, etc.) for data traffic, within a communication network of any topology.

In one embodiment of the present invention blockages are formed at different ports of the nodes to ensure loop avoidance. The blockages block only the data traffic and not the control messages that depict state of a link.

In one embodiment of the present invention the restoration of fault link is based upon GET and POST commands.

As per the present invention, the restoration of the fault link may be applied for various network topologies including but not limited to star topology, ring topology and tree topology.

Embodiments of the present invention therefore teaches a person skilled in art to restore, maintain or improve network connectivity and network behavior or function within a communication network of any topology Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures.

DESCRIPTION OF THE INVENTION

The present invention described herein, discloses a method and a system for restoring, maintaining or improving network connectivity and network behavior or function within a communication network of any topology. This is accomplished by first identifying membership with an existing tree within the network. Thereafter, occurrence of fault in any link of the tree may be identified. Upon detecting the fault in a link, the nodes associated to the fault link seek information from its neighboring nodes. The information is then used for updating previous information that the nodes associated with the fault link have. The updated information thereby helps in restoring the fault link wherein the restoration of fault link is based upon GET and POST commands.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems. The best mode of the invention described in the specification illustrates the exemplary embodiment of the invention. It is understood that one skilled in art may modify or change the modules used in the best mode of invention.

Reference in the specification to "one embodiment" or "an embodiment" means that a particular feature, characteristic, or function described in connection with the embodiment is included in at least one embodiment of the invention. The appearances of the phrase "in one embodiment" in various places in the specification are not necessarily all referring to the same embodiment.

The GET and POST commands are capable of being piggy-backed over any control messages.

In one embodiment herein, the information obtained and requested may include data, port address, quality of message packet, priority, service identifier, hop counts, system resource, system capability, system state, etcetera.

In one embodiment herein, the existing tree may be identified by identifiers including VLAN identifier.

In one embodiment of the present invention, the restoration mechanism is used to maintain or improve network connectivity and network behaviour or function upon receipt of command from management plane or control plane to build optimal network condition (e.g. minimum hops, maximum bandwidth, etc.) for data traffic, within a communication network of any topology.

Management plane is abstraction layer that network-operators use to restore, maintain (maintain means overlooking the network behaviour) and improve the connectivity, condition, etc.

Control plane is abstraction wherein control packets and signaling packets will perform automatically the above functions.

Figure 1:
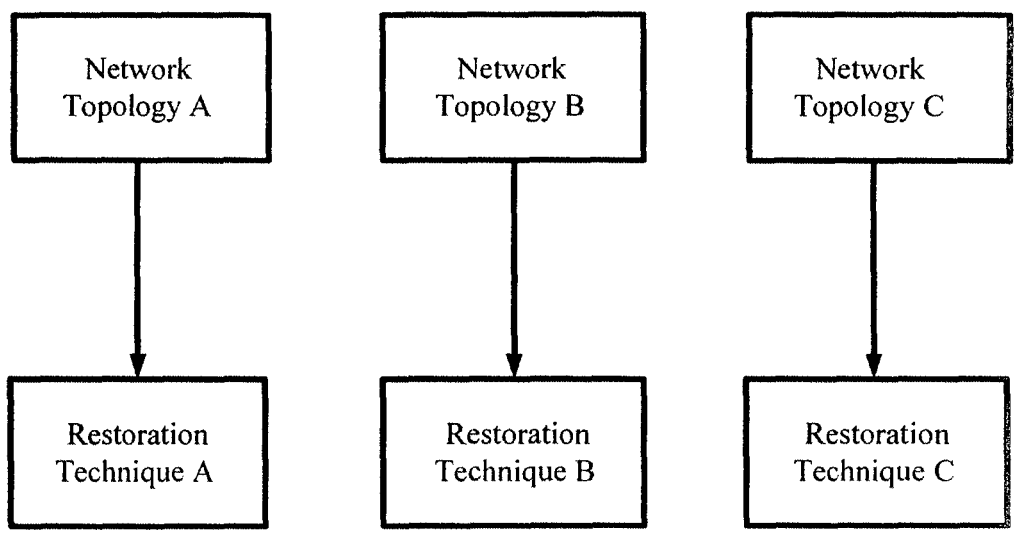
FIG. 1 illustrates how different restoration mechanism is applied on different network topologies as known in the prior art to restore the network under fault condition.
Figure 2:
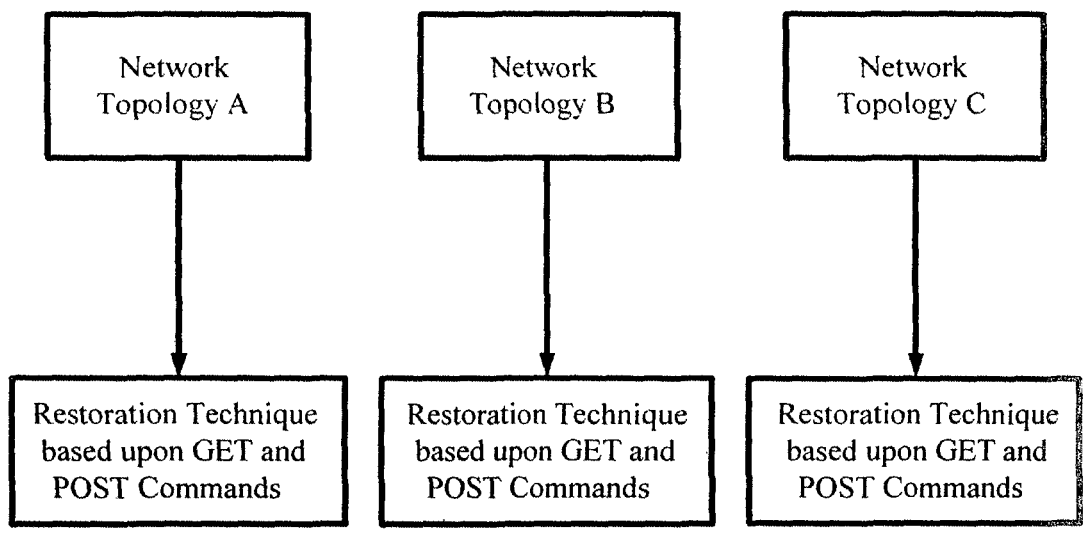
FIG. 2 illustrates how a single restoration mechanism may be applied on different network topologies according to the present invention to restore the restore the network under fault condition.

FIG. 2 illustrates how a single restoration mechanism may be applied on different network topologies according to the present invention to restore the fault links.

As mentioned above the updated information thereby helps in restoring the fault link wherein the restoration of fault link .is based upon GET and POST commands. If a GET message or command is received by a node then if the information is available the receiver node will respond to the sender node the requested information with POST command; if the information is not available, the receiver node will unicast or multicast or broadcast the same or newer GET message with additional or reduced information to its neighbors, except the one that originally sent the GET message. Further, if POST message is received by a node, the receiver node will update the configuration table and unicast, multicast or broadcast the same or newer POST message with additional or reduced information to its neighbors, except the one that originally sent the POST message.

Figure 3:
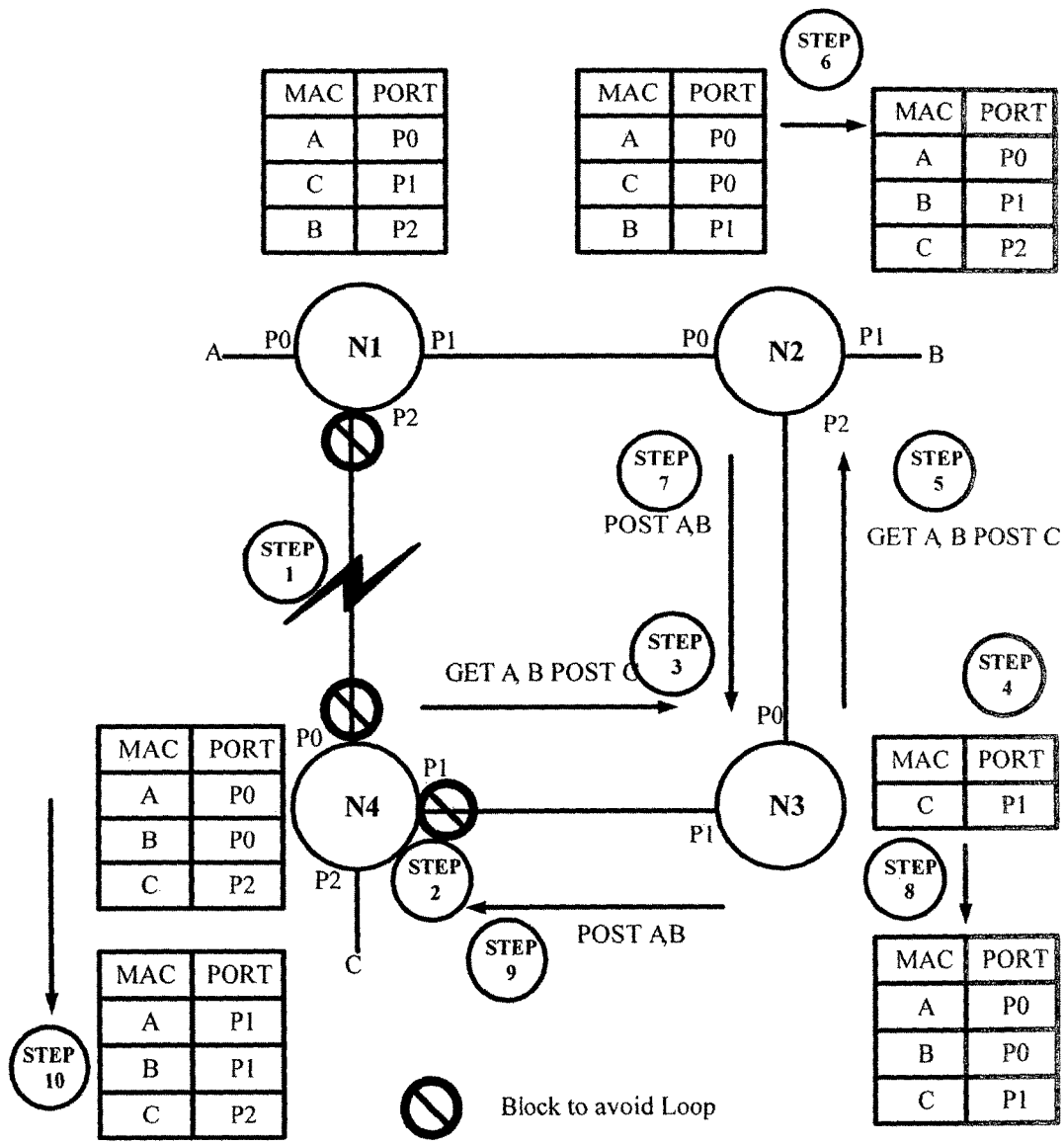
FIG. 3 is an illustration of fault detection of a link between a pair of nodes and the restoration of the link according to an embodiment of the present invention.

Exemplary embodiment of the invention will now be explained with the help of FIG. 3. FIG. 3 is an illustration of fault detection of a link between a pair of nodes and the restoration of the link according to an embodiment of the present invention.

As can be seen in FIG. 3, let us assume a topology having nodes N1, N2, N3, and N4. Each node have multiple ports P0, P1 and P2. The topology includes but not limited to star topology, ring topology, mesh topology and tree topology.

If a fault occurs (STEP 1) between link N1-N4, then detection of fault is done by implementing various ways defined in literatures and standards including IEEE. Ways of fault detection include loss of light signal being received at receiver end, received error bits, breaking of continuous message being received periodically at receiver end etcetera. N4 and N1 will be the 'associated-nodes'. As can be seen from the figure, ports P0 on N4 and P2 on N1 are blocked immediately after the detection of fault. Node N4 is now isolated from the rest of the topology.

Port P1 is unblocked leading to node N4 connecting back to other nodes in the topology (STEP 2). MAC addresses of A and B are unreachable by N4 due to the fault. Therefore, as per the present invention, node N4 issues a GET and POST command through the next unblocked port in the topology. The GET and POST commands will say, "GET A,B; POST C" (STEP 3) which means if a neighboring node i.e. N3 has addresses of A and B then it should send corresponding 'yes' or 'no' within a POST command. This is check for reachability to A, and B. If the neighboring node N3 does not have any entry in the table, it will issue GET and POST command through the unblocked or open port. "POST C" means that from now onwards, MAC address of C may be reached through node N4.

Neighboring node N3 will thus learn C on port P1 and updates the MAC table (STEP 4). Now N3 will issue "GET A,B; POST C" command (STEP 5). N2 will hence update its entry with MAC address (STEP 6). Since N2 had received GET A,B from N3 and since it has entries for A and B in its MAC table, it will respond with "POST A, B" to N3 (STEP 7). Now N3 will update its MAC table with entries for A and B (STEP 8).

Now, there was a pending response from N3 at N4 because N4 had issued GET A, B command. Thus now N3 will issue "POST A,B" command to N4 (STEP 9).

As soon as N4 receives the 'POST A,B' command, it will update its MAC table with A and B on Port P1 (STEP 10).

The same process also happens at node N1.

The process illustrated in the above example is via GET and POST for MAC addresses. The same will be valid for getting and posting any network attributes or parameters like VLAN, QoS, etc.

In one embodiment herein there is provided a system for restoring a fault link between a pair of nodes associated to the link within a communication network of any topology using any loop avoidance or mitigation technology. The system comprises a membership with an existing tree or loop-free topology within the network; an identifier for identifying occurrence of fault in any link of the tree; information being obtained from neighboring nodes of the associated-nodes under fault, operator command or to build optimal network condition for traffic; wherein the information are used for updating previous information having with the associated nodes thereby restoring the fault link and wherein the restoration of fault link or maintaining or improving network connectivity and network behaviour is based upon GET and POST commands.

In various embodiments of the present invention, the blockages are formed at different ports of the nodes to ensure loop avoidance. The blockages block only the data traffic and not the control messages that depict state of a link.

Also, the topology may include but does not limit to star topology, ring topology, mesh topology and tree topology.

The foregoing description of the invention has been described for purposes of clarity and understanding. It is not intended to limit the invention to the precise form disclosed. Various modifications may be possible within the scope and equivalence of the appended claims.

We claim:

1. A method for restoring network connectivity in links between nodes associated with a communication network, comprising:
   detecting a fault in the communication network, the fault being in a first communication link between a first node and a second node coupled to the communication network;
   unblocking a second communication link between the second node and a third node coupled to the communication network, and establishing the second communication link;
   sending a first HTTP GET request and POST command from the second node to the third node using the second communication link, the first GET request including an address of the first node, and the first POST command including an address of the second node;
   when node specific path information stored in the third node indicates an unblocked communication path between the third node and the first node, sending a second POST command from the third node to the second node indicating the unblocked communication path between the third node and the first node;
   when node specific path information stored in the third node does not indicate an unblocked communication path between the third node and the first node, sending a second GET request with updated information from the third node to a fourth node in the communication network that has not received the first GET request;
   receiving, at the second node, the second POST command; and
   updating node specific path information stored in the second node and third node, the node specific path information indicating the unblocked communication path between the third node and the first node, and unblocked communication paths between the third node and the second node.

2. The method of claim 1, further comprising:
   when a third POST command is received by the third node from the fourth node in response to the second GET request, updating node specific path information stored in the third node,
   wherein the second POST command contains updated information based on the third POST command, and the third node does not send an updated POST command to the fourth node.

3. The method as in claim 1, wherein detecting the fault includes detecting a loss of light signal being received at the first node or the second node, receiving error bits at the first node or the second node, or breaking a continuous message being received periodically at the first node or the second node.

4. The method as in claim 1, wherein communication links are blocked at different ports of the nodes to ensure loop avoidance, and the blockages block only data traffic carried by the blocked communication link and not control messages that depict a state of a link.

5. The method of claim 1, wherein all of the GET requests and POST commands are capable of being piggy-backed over any control messages.

6. The method as in claim 1, wherein the node specific path information includes data, port address, quality of message packet, priority, service identifier, hop counts, system resource, system capability, or system state.

7. The method as in claim 1, wherein the communication network can be identified by identifiers including VLAN identifier.

8. A system for restoring network connectivity in links between nodes associated with a communication network, comprising:
   the communication network, including links between multiple nodes in the communication network, the multiple nodes storing node specific path information indicating blocked and unblocked communication links between a node and other nodes in the communication network; and
   the multiple nodes, which are configured to:
      detect a fault in a first communication link of the communication links that is blocking data communications between a first node and a second node of the multiple nodes;
      unblock a second communication link of the communication links between the second node and a third node of the multiple nodes;
      send a first HTTP GET request and POST command requesting the node specific path information from the second node to the third node using the second communication link;
      when node specific path information stored in the third node indicates an unblocked communication path between the third node and the first node, send a second POST command from the third node to the second node indicating the unblocked communication path between the third node and the first node;
      when node specific path information stored in the third node does not indicate an unblocked communication path between the third node and the first node, send a second GET request with updated information from the third node to a fourth node in the communication network that has not received the first GET request;
      at the second node, process the second POST command; and
      update node specific path information stored in the second node and third node, the node specific path information indicating the unblocked communication path between the third node and first node, and unblocked communication paths between the third node and the second node.

9. The system as in claim 8, wherein when a third POST command is received by the third node from the fourth node in response to the second GET request, the third node updates node specific path information stored in the third node, the second POST command contains updated information based on the third POST command, and the third node does not send an updated POST command to the fourth node.

10. The system as in claim 8, wherein detecting the fault includes detecting a loss of light signal being received at the first node or the second node, receiving error bits at the first node or the second node, or breaking a continuous message being received periodically at the first node or the second node.

11. The method of claim 2,
   wherein the third POST command indicates that the first node can be accessed by the third node via the fourth node.

\* \* \* \* \*